No. 838,368. PATENTED DEC. 11, 1906.
A. YOUDELMAN.
LIQUID MEASURING DEVICE.
APPLICATION FILED AUG. 6, 1906.

2 SHEETS—SHEET 1.

WITNESSES
Edward Thorpe.

INVENTOR
Alexander Youdelman
BY Munn & Co
ATTORNEYS

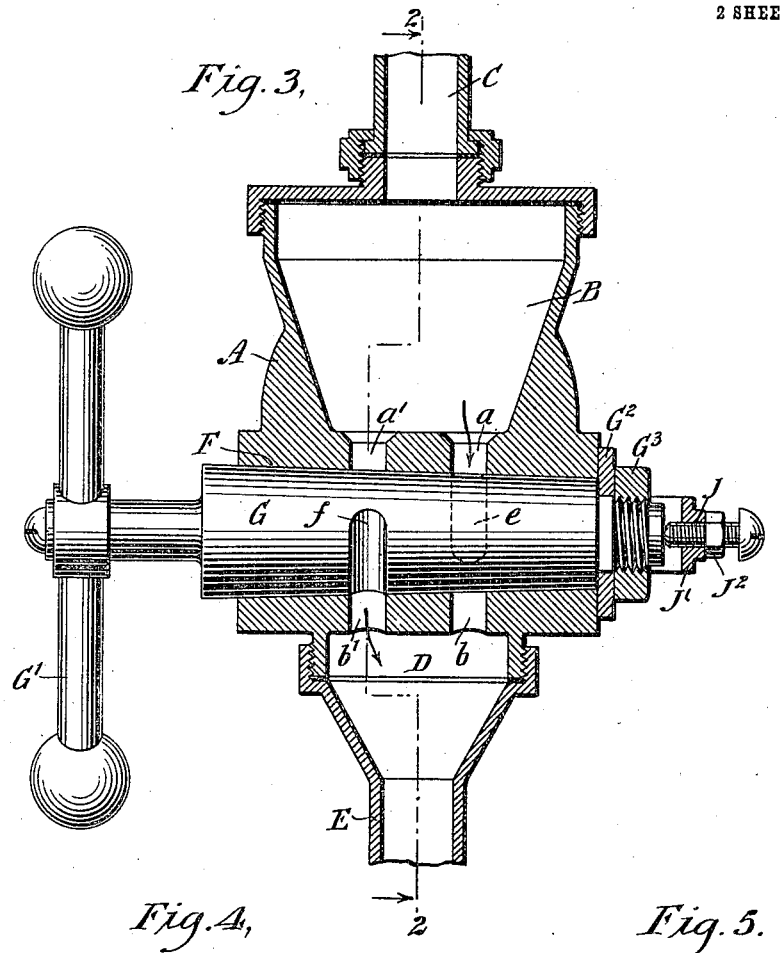
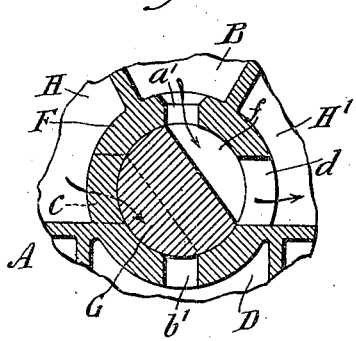
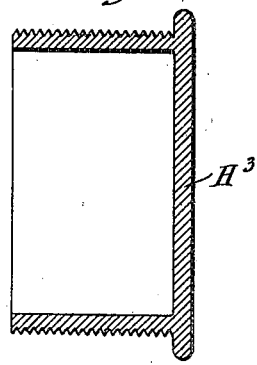

UNITED STATES PATENT OFFICE.

ALEXANDER YOUDELMAN, OF NEW YORK, N. Y.

LIQUID-MEASURING DEVICE.

No. 838,368.  Specification of Letters Patent.  Patented Dec. 11, 1906.

Application filed August 6, 1906. Serial No. 329,380.

*To all whom it may concern:*

Be it known that I, ALEXANDER YOUDELMAN, a citizen of the United States, and a resident of the city of New York, borough of Manhattan, in the county and State of New York, have invented a new and Improved Liquid-Measuring Device, of which the following is a full, clear, and exact description.

The invention relates to measuring instruments; and its object is to provide a new and improved liquid-measuring device under the control of an operator and arranged for delivering liquids in accurately-measured quantities and without any waste or danger of wrong manipulation of the device by the operator.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1:
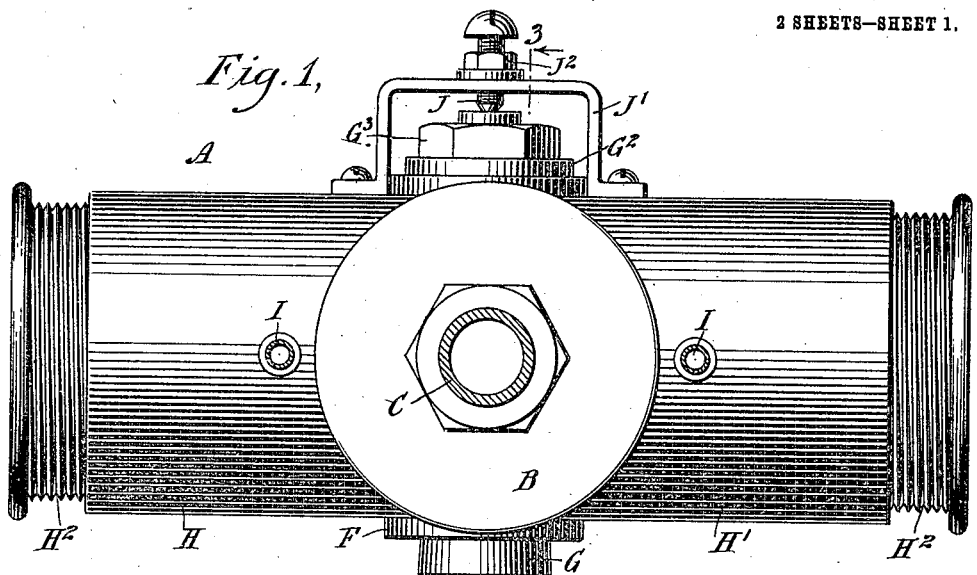
Figure 2:
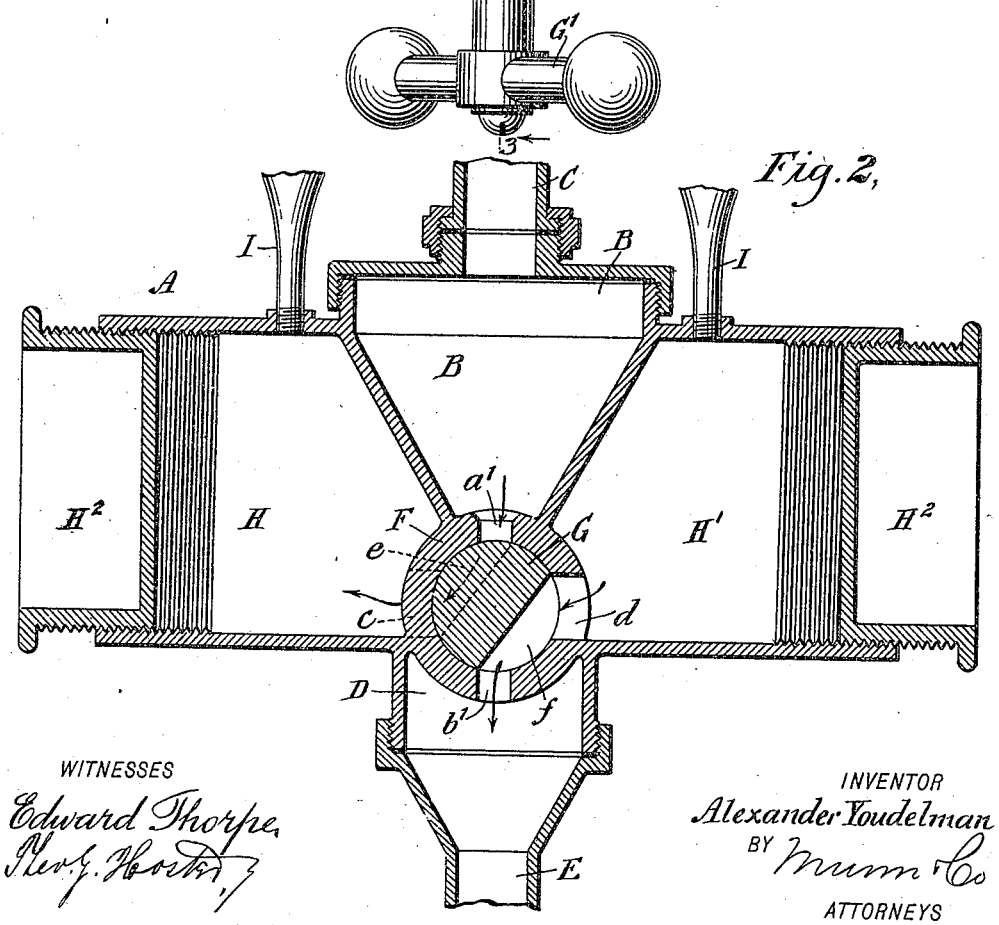

Figure 1 is a plan view of the improvement. Fig. 2 is a longitudinal sectional elevation of the same on the line 2 2 of Fig. 3. Fig. 3 is a transverse section of the same on the line 3 3 of Fig. 1. Fig. 4 is a sectional side elevation of the improvement, showing the valve in a different position from the one shown in Fig. 2; and Fig. 5 is a sectional side elevation of one of the screw-plugs for increasing the capacity of the measuring-chamber.

A suitably-constructed casing A is provided at the top with a receiving-chamber B, connected by a pipe C or the like with a source of liquid-supply to fill the chamber B with a liquid to be dispensed in measured quantities, as hereinafter more fully described. The casing A is provided at the bottom with an outlet D, carrying a discharge spout or funnel E for directing the measured liquid to a glass or other vessel held under the spout. In the casing A, between the receiving-chamber B and the outlet D, is formed a transversely-extending valve-seat F, containing a turnable plug-valve G, and within the casing A and to the sides of the said valve-seat F are arranged the measuring-chambers H and H', adapted to be connected by the valve G alternately with the receiving-chamber B to fill the corresponding measuring-chamber H or H' with liquid from the said receiving-chamber B. The valve G also serves to alternately connect the measuring-chambers H and H' with the outlet D. The chamber H or H' connected at the time with the receiving-chamber B, and hence filling, is disconnected by the valve G from the outlet D, while the chamber H' or H previously filled and disconnected from the receiving-chamber B is connected at the time with the outlet D to allow the liquid to flow from this measuring-chamber into the outlet D and through the spout E thereof into a glass or other vessel held below the said spout.

For the purpose described the valve-seat F is provided at the top with the spaced inlet-ports $a$ and $a'$, (see Fig. 3,) opening into the receiving-chamber B, and at the bottom of the said valve-seat F are arranged the spaced outlet-ports $b\ b'$, opening into the outlet D and located directly opposite the inlet-ports $a$ and $a'$. The seat F is also provided at opposite sides with ports $c$ and $d$, of which the port $c$ opens into the measuring-chamber H and is in alinement with the ports $a$ and $b$, and with a port $e$, formed in the peripheral face of the valve G. The port $d$ opens into the measuring-chamber H' and is in alinement with the ports $a'\ b'$ and with a port $f$, formed in the peripheral surface of the valve G, as plainly indicated in Fig. 3. When the several parts are in the position illustrated in Fig. 2, then the port $e$ connects the ports $a$ and $c$ with each other, so that the liquid contained in the receiving-chamber B can flow by way of the said ports into the measuring-chamber H to fill the same. By reference to Fig. 2 it will also be noticed that the other port $f$ at the same time connects the ports $d$ and $b'$ with each other, so that the liquid contained in the measuring-chamber H' will flow by way of said ports into the outlet D and through the spout E into the glass or other vessel to be filled. When the measuring-chamber H is filled and the measuring-chamber H' is emptied, then the operator gives about a quarter-turn to the valve G, so that the port $f$ connects the ports $a'$ and $d$ with each other to allow the liquid to flow from the receiving-chamber B into the measuring-chamber H' to fill the same, the measuring-chamber H' now being disconnected from the port b'. The measuring-chamber H previously filled is now disconnected from the receiving-chamber B, but is connected by the ports c, e, and b with the outlet D, so that the quantity of liquid contained in the measuring-chamber H can flow into the glass or vessel held below the spout E. Thus while one measuring-receptacle H or H' is filling the other is discharging the measured quantity.

Each of the measuring-chambers H and H' is provided with a suitable vent I to insure a complete filling and emptying of the said chambers.

In order to allow of adjusting the measuring-chambers H and H' to different sizes, interchangeable screw-plugs $H^2$ and $H^3$ are provided, (see Figs. 2 and 5,) which screw-plugs are adapted to screw into the ends of the chambers H and H'. On screwing the screw-plug $H^2$ inward less liquid is measured at a time in the corresponding chamber, and on screwing the screw-plug $H^2$ outward more liquid can pass into the measuring-chamber. Thus by screwing the screw-plug $H^2$ inward or outward the desired amount of liquid to be dispensed at a time can be regulated to a nicety. If it is desired to increase the capacity of the measuring-chamber H and H', use is made of the screw-plugs $H^3$, of which one is shown in Fig. 5. This screw-plug $H^3$ is in cup shape, and when in position on the end of the corresponding measuring-chamber H or H' its capacity is added to that of the chamber, and hence the measuring capacity of the chambers H and H' is correspondingly increased.

The valve G is preferably made conical (see Fig. 3) and is provided at its front or base end with a suitable handle G', adapted to be taken hold of by the operator for turning the valve G, as previously explained.

The rear or small end of the valve G is connected by a suitable washer $G^2$ and nut $G^3$ to hold the valve G sufficiently tight in its valve-seat F to prevent leakage; but in order to prevent the valve from sticking in the valve-seat F by the operator aforesaid pressing the valve G rearwardly the following device is provided: The rear terminal of the valve G abuts against the pointed end of a screw J, screwing in a yoke J', attached to the valve-casing A, and the said screw J is locked in place on the yoke J' by a jam-nut $J^2$. Now it will be seen that by the arrangement described the screw J prevents any rearward movement of the valve G, and hence the latter is always free to turn in its valve-seat F without danger of binding or sticking.

The liquid-measuring device shown and described is very simple and durable in construction, composed of comparatively few parts, and not liable to easily get out of order.

Having thus described my invention, I claim as new and desire to secure by Letters Patent—

1. A liquid-measuring device, comprising a receiving-chamber, an outlet, open-ended measuring-chambers intermediate the said receiving-chamber and the said outlet, a valve manually controlled arranged for connecting the said receiving-chamber alternately with the said measuring-chambers, and for connecting the said measuring-chambers alternately with the said outlet, and interchangeable and adjustable means for closing the ends of the measuring-chambers and increasing or diminishing the size of the said chambers.

2. A liquid-measuring device, comprising a casing having a receiving-chamber at the top, an outlet at the bottom, a valve-seat intermediate the said chamber, and outlet and measuring-chambers on opposite sides of the said valve-seat, said chambers having open screw-threaded ends, screw-threaded plugs in the ends of the chambers and a turnable plug-valve mounted to turn in the said seat for controlling the flow of the liquid from the said receiving-chamber alternately to the said measuring-chambers, and from the latter alternately to the said outlet.

3. A liquid-measuring device, comprising a casing having a receiving-chamber at the top, an outlet at the bottom, a valve-seat intermediate the said chamber and outlet, and measuring-chambers on opposite sides of the said valve-seat, a turnable plug-valve mounted to turn in the said seat for controlling the flow of the liquid from the said receiving-chamber alternately to the said measuring-chambers, and from the latter alternately to the said outlet, and means for adjusting the valve axially and holding it against axial movement after adjustment is made.

4. A liquid-measuring device, comprising a casing having a receiving-chamber at the top and projecting into the casing, an outlet at the bottom, a valve-seat intermediate the said chamber and outlet, and open-ended measuring-chambers on opposite sides of the said valve-seat and provided with interchangeable screw-plugs for closing the ends of the measuring-chambers increasing and decreasing the sizes of the said measuring-chambers, and a turnable plug-valve mounted to turn in the said seat for controlling the flow of the liquid from the said receiving-chamber alternately to the said measuring-chambers, and from the latter alternately to the said outlet.

5. A liquid-measuring device, comprising a casing having a receiving-chamber at the top, an outlet at the bottom, a valve-seat intermediate the said chamber and outlet, and measuring-chambers on opposite sides of the said valve-seat, the said valve-seat having spaced inlet-ports opening into the said receiving-chamber, outlet-ports opening into the said outlet, and side ports opening into the said measuring-chambers, and a turnable plug-valve mounted to turn in the said seat and having ports adapted to register with the said valve-seat ports for controlling the flow of the liquid from the said receiving-chamber alternately to the said measuring-chambers, and from the latter alternately to the said outlet.

In testimony whereof I have signed my name to this specification in the presence of two subscribing witnesses.

ALEXANDER YOUDELMAN.

Witnesses:
    THEO. G. HOSTER,
    EVERARD B. MARSHALL.